(12) United States Patent
Benisty (10) Patent No.: US 10,558,367 B2
(45) Date of Patent: Feb. 11, 2020

(54) ADAPTIVE TRANSACTION LAYER PACKET FOR LATENCY BALANCING

(71) Applicant: Western Digital Technologies, Inc., San Jose, CA (US)

(72) Inventor: Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/916,082

(22) Filed: Mar. 8, 2018

(65) Prior Publication Data

US 2019/0278485 A1    Sep. 12, 2019

(51) Int. Cl.
*G06F 3/06*    (2006.01)
*G06F 13/28*   (2006.01)
*G06F 13/40*   (2006.01)
*G06F 13/16*   (2006.01)

(52) U.S. Cl.
CPC .......... *G06F 3/0611* (2013.01); *G06F 3/0659* (2013.01); *G06F 3/0679* (2013.01); *G06F 13/1668* (2013.01); *G06F 13/28* (2013.01); *G06F 13/4068* (2013.01); *G06F 2213/0026* (2013.01)

(58) Field of Classification Search
CPC ..... G06F 3/0611; G06F 3/0659; G06F 3/0679
See application file for complete search history.

(56) References Cited

U.S. PATENT DOCUMENTS

| 7,457,897 | B1 | 11/2008 | Lee et al. |
| 9,292,465 | B2 | 3/2016 | Trivedi et al. |
| 9,424,219 | B2 | 8/2016 | Saghi et al. |
| 9,442,866 | B1 * | 9/2016 | Post .................... G06F 13/1615 |
| 9,626,120 | B1 * | 4/2017 | Jia .......................... G06F 3/0613 |
| 9,678,904 | B2 | 6/2017 | Volkening et al. |
| 2016/0371221 | A1 | 12/2016 | Rosenberg et al. |
| 2017/0024333 | A1 | 1/2017 | Rui et al. |
| 2019/0004796 | A1 * | 1/2019 | Pelster ................ G06F 9/30003 |

FOREIGN PATENT DOCUMENTS

| CN | 103336745 A | 10/2013 |
| CN | 103885909 A | 6/2014 |

OTHER PUBLICATIONS

Eshghi, et al.; SSD Architecture and PCI Express Interface; dated 2013; 28 total pages.

* cited by examiner

*Primary Examiner* — Edward J Dudek, Jr.
(74) *Attorney, Agent, or Firm* — Patterson & Sheridan, LLP; Steven H. Versteeg (57) ABSTRACT

Embodiments of the present disclosure generally relate to a storage device with reduced latency and a method of accessing data by a storage device with reduced latency. In one embodiment, a method of accessing data by a storage device with reduced latency include triggering a controller of the storage device for issuing a host read request. The controller determines if latency is critical for completion of the host read request. The controller issues the host read request in dynamic host read request size if latency is critical.

29 Claims, 9 Drawing Sheets

| READ REQUEST SIZE 520 | HIGH WORKLOAD 530A | | | MEDIUM WORKLOAD 530B | | | LOW WORKLOAD 530C | | |
|---|---|---|---|---|---|---|---|---|---|
| | AVERAGE LATENCY 510A | MAX LATENCY 510B | MIN LATENCY 510C | AVERAGE LATENCY 510D | MAX LATENCY 510E | MIN LATENCY 510F | AVERAGE LATENCY 510G | MAX LATENCY 510H | MIN LATENCY 510I |
| 128 BYTES | $L_0$ uSec | $L_0$ uSec | $L_0$ uSec | $L_0$ uSec | $L_0$ uSec | $L_0$ uSec | $L_0$ uSec | $L_0$ uSec | $L_0$ uSec |
| 256 BYTES | $L_1$ uSec | $L_1$ uSec | $L_1$ uSec | $L_1$ uSec | $L_1$ uSec | $L_1$ uSec | $L_1$ uSec | $L_1$ uSec | $L_1$ uSec |
| 384 BYTES | $L_2$ uSec | $L_2$ uSec | $L_2$ uSec | $L_2$ uSec | $L_2$ uSec | $L_2$ uSec | $L_2$ uSec | $L_2$ uSec | $L_2$ uSec |
| 512 BYTES | $L_3$ uSec | $L_3$ uSec | $L_3$ uSec | $L_3$ uSec | $L_3$ uSec | $L_3$ uSec | $L_3$ uSec | $L_3$ uSec | $L_3$ uSec |
| ... | ... | ... | ... | ... | ... | ... | ... | ... | ... |
| 4096 BYTES | $L_{31}$ uSec | $L_{31}$ uSec | $L_{31}$ uSec | $L_{31}$ uSec | $L_{31}$ uSec | $L_{31}$ uSec | $L_{31}$ uSec | $L_{31}$ uSec | $L_{31}$ uSec |

ADAPTIVE TRANSACTION LAYER PACKET FOR LATENCY BALANCING

BACKGROUND OF THE DISCLOSURE

Field of the Disclosure

Embodiments of the present disclosure generally relate to a storage device with reduced latency and a method of accessing data by a storage device with reduced latency.

Description of the Related Art

A host computer system may access data in a storage device, such as a flash memory device, for long term storage of data in a non-volatile memory storage media of the storage device. The host computer system and storage device may transmit data to each other as data packets. The size of the data packet is set to a default maximum size. This default maximum size may adversely impact completion of memory requests. Therefore, there is a need for an improved storage device and improvement method of accessing data from a storage device.

SUMMARY OF THE DISCLOSURE

Embodiments of the present disclosure generally relate to a storage device with reduced latency and a method of accessing data by a storage device with reduced latency.

In one embodiment, a method of accessing data by a storage device with reduced latency includes triggering a controller of the storage device for issuing a host read request. The controller determines if latency is critical for completion of the host read request. The controller issues the host read request in a dynamic host read request size if latency is critical. For example, the dynamic host read request size may be lower than a static maximum read request size.

In another embodiment, a storage device with reduced latency includes a non-volatile memory. A controller is coupled to the non-volatile memory. The controller includes phys adapted to be linked to a host, a direct memory access module, and latency monitor. The latency monitor is configured to measure a plurality of latencies between a plurality of read request transaction layer packets issued by the direct memory access module and a plurality of completion transaction layer packets received by the controller.

In yet another embodiment, a method of accessing data by a storage device with reduced latency includes determining whether a host read request to be issued is latency critical. A controller determines whether a transaction size to be requested by a host read request is greater than a maximum TLP payload size floor. The controller selects a read request size in response to determining the transaction size is greater than the maximum transaction layer packet payload size floor. The controller issues a host read request in the selected read request size.

In still another embodiment, a storage device with reduced latency includes a non-volatile memory and a TLP payload size selector means. The TLP payload size selector means is configured to select a transaction size of a read request TLP based upon a desired latency.

In still yet another embodiment, a storage device with reduced latency includes a controller coupled to a non-volatile memory and coupled to a host through one or more PCIe links. The controller determines if latency is critical for completion of a host read request. The controller issues the host read request in a selected read request size based upon a selected latency.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to a storage device configured to provide an adaptive and/or a dynamic memory read request size. For example, the storage device may be configured to provide a memory read request size adapting to latency versus performance. In another example, the storage device may be configured to provide a memory read request size by dynamically setting a read request size lower than the maximum read request size set by the host.

Figure 1:
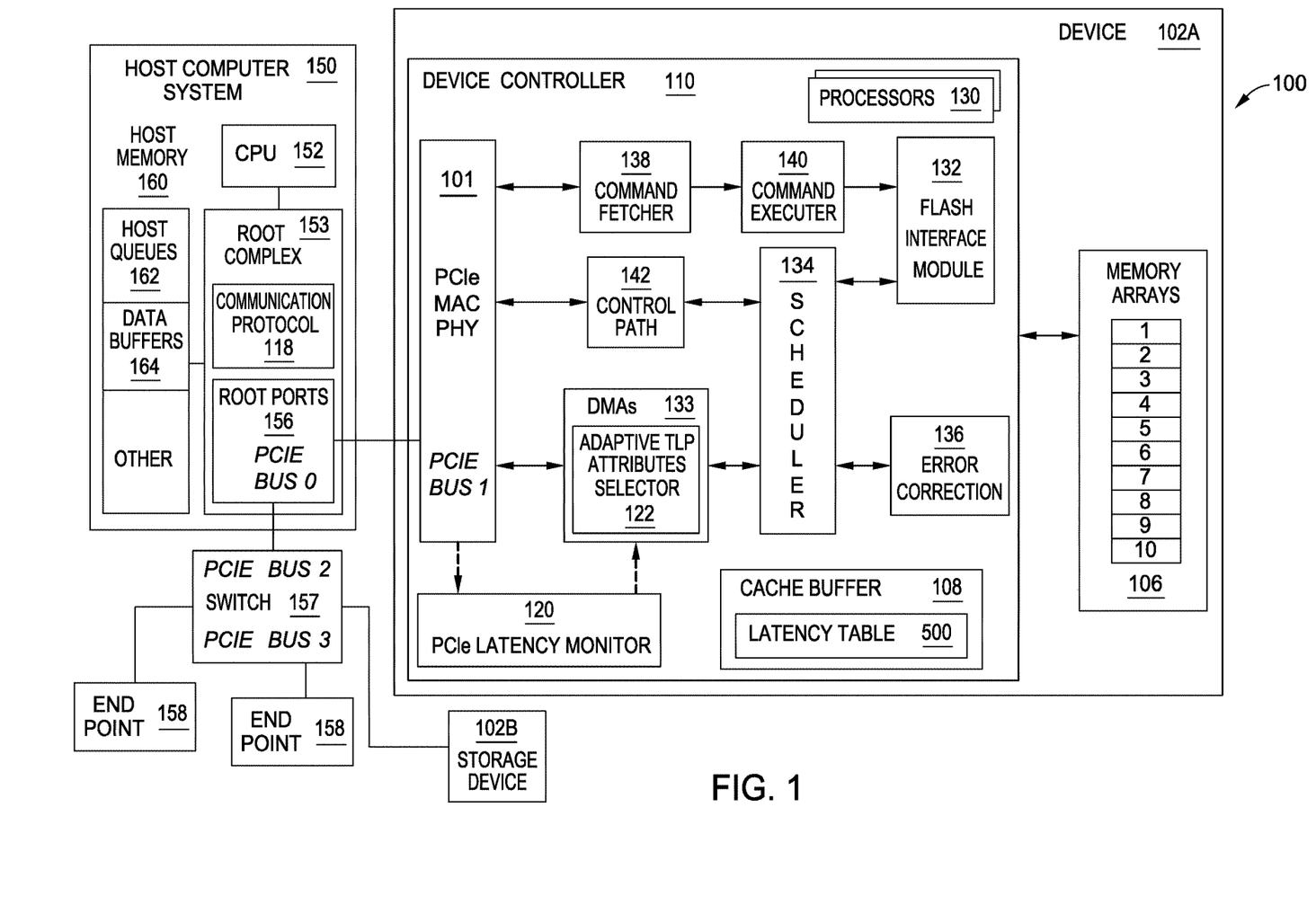
FIG. 1 is a schematic illustration of one embodiment of a system including a host and a storage device, such as a solid state drive (SSD).

FIG. 1 is a schematic illustration of one embodiment of a system 100 including an initiator or host 150 and a storage device 102, such as a solid state drive (SSD), for host 150. Host 150 may utilize a non-volatile memory (NVM) 106 included in storage device 102 to write and to read data, such as for long term memory storage. Storage device 102 may be an internal storage drive, such as a notebook hard drive or a desktop hard drive. Storage device 102 may be a removable mass storage device, such as, but not limited to, a handheld, removable memory device, such as a memory card (e.g., a secure digital (SD) card, a micro secure digital (micro-SD) card, or a multimedia card (MMC)) or a universal serial bus (USB) device. Storage device 102 may take the form of an embedded mass storage device, such as an eSD/eMMC embedded flash drive, embedded in host 150. Storage device 102 may also be any other type of internal storage device, removable storage device, embedded storage device, external storage device, or network storage device.

Host 150 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving). In certain embodiments, host 150 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware.

Host 150 includes a central processing unit (CPU) 152 connected to a host memory space 160, such as DRAM or other main memories. An application program may be stored to memory space 160 for execution by components of host 150. Host memory space 160 may include host queues 162, such as command submission queues and command completion queues. Host memory space 160 may include data buffers 164, such as a host data buffer.

Root complex 153 may be integrated with CPU 152 or may be a discreet component. Root complex 153 includes root ports 156. One root port 156 may be directly coupled to storage device 102A. Another root port 156 may be coupled to a switch 157, such as a PCIe switch. Switch 156 may be coupled to any appropriate end point device 158, such as storage device 102B. Therefore, storage device 102A may be directly coupled to host 150, or storage device 102B my coupled to host 150 through switch 157.

One mode of switch 157 is store-and-forward packet switching. In store-and-forward packet switching, switch 157 waits until the entire packet is received prior to forwarding the packet. For example, switch 157 may wait until receiving an entire packet from host memory space 160 prior to forwarding the entire packet to storage device 102B connected as an end point device to switch 157.

Storage device 102, includes mac and phy components 101, for ingress of communications from host 150 to storage device 102 and egress of communications from storage device 102 to host 150 through root port 156. A link between storage device 102A, 102B, root ports 156, switch 157, or end point devices 158 may be any appropriate link, such as a PCIe link. A PCIe link may one to thirty-two lanes, depending on the number of available phys connecting two PCIe. The PCIE link is typically set during end point device initialization, such as initialization of storage device 102A, 102B.

Root Complex 153 and host interface 101 operate under a communication protocol 118, such as a Peripheral Component Interface Express (PCIe) serial communication protocol or other suitable communication protocols. Other suitable communication protocols include ethernet, serial attached SCSI (SAS), serial AT attachment (SATA), any protocol related to remote direct memory access (RDMA) such as Infiniband, iWARP, or RDMA over Converged Ethernet (RoCE), and other suitable serial communication protocols. Storage device 102 may also be connected to host 150 through a switch or a bridge.

NVM 106 of storage device 102 may be configured for long-term storage of information as non-volatile memory space and retains information after power on/off cycles. NVM 106 may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in storage device 102. Each platter may contain one or more regions of one or more tracks of data. NVM 106 may include one or more types of non-volatile memory.

Storage device 102 includes a controller 110 which manages operations of storage device 102, such as writes to and reads from NVM 106. Controller 110 may include one or more processors 130, which may be multi-core processors. Processor 130 handles the components of storage device 102 through firmware code.

Controller 110 may operate under NVM Express (NVMe) protocol, but other protocols are applicable. NVMe protocol is a communications interface/protocol developed for SSDs to operate over a host and storage device linked over a PCIe interface. NVMe protocol provides a command submission queue and command completion queue for access of data stored in storage device 102 by host 150. Storage device 102 may fetch or read host commands from a command submission queue of host queues 162 of host memory space 160.

Controller 101 may also include a volatile cache buffer 108 for short-term storage or temporary memory during operation of storage device 102. Cache buffer 108 may not retain stored data if powered off. Examples of cache buffer 108 include dynamic random access memories (DRAM), static random access memories (SRAM), and other forms of volatile memories.

Controller 110 executes computer-readable program code (e.g., software or firmware) executable instructions (herein referred to as "instructions"). The instructions may be executed by various components of controller 110, such as processor 130, logic gates, switches, application specific integrated circuits (ASICs), programmable logic controllers, embedded microcontrollers, and other components of controller 110.

The instructions are stored in a non-transitory computer readable storage medium. In certain embodiment, the instructions are stored in a non-transitory computer readable storage medium of storage device 102, such as in a read-only memory or NVM 106. Instructions stored in storage device 102 may be executed without added input or directions from host 150. In other embodiments, the instructions are transmitted from host 150. The controller 110 is configured with hardware and instructions to perform the various functions described herein and shown in the figures.

Storage device 102 may also include other components, such as flash interface module 132, a direct memory access DMA module 133, a scheduler 134, an error correction module 136, a command executor 140, and a control path 142. Flash interface module 132 interacts with NVM 106 for read and write operations. DMA module 133 executes data transfers between host 150 and storage device 102 without involvement from CPU 152. Scheduler 134 controls the data transfer while activating the control path for fetching physical page regions (PRPs), posting completion and interrupts, and activating the DMAs for the actual data transfer between host 150 and storage device 102. Error correction module 136 corrects the data fetched from the memory arrays. Command fetcher 138 fetches commands to command executor 140 for execution on flash interface module 132.

Figure 2:
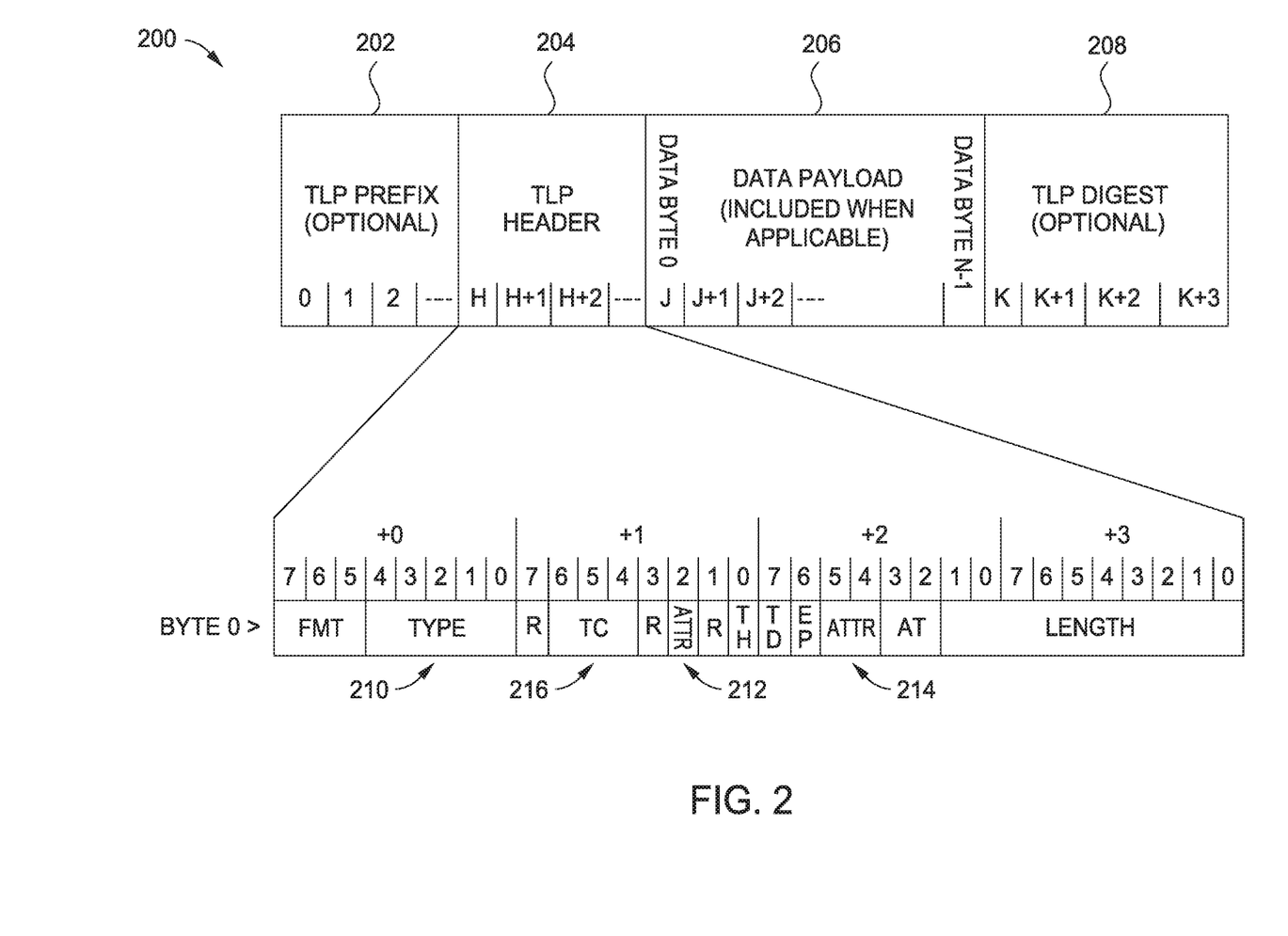
FIG. 2 is a schematic diagram of a transition layer packet (TLP) in certain embodiments.

FIG. 2 is a schematic diagram of a transition layer packet (TLP) 200 in certain embodiments. In the PCIe communication protocol, host 150 and storage device 102 may send requests to each other as TLPs 200. For example, storage device 102 may issue a host read request to host 150 to read data from host 150.

The associated data of the request is also transferred as a data payload 206 of TLPs 200. For example, a host memory read request TLP 200 may be issued by storage device 102 to host 150 and host 150 sends the requested data as data payload 206 in one or more completion TLPs 200.

TLP 200 may include an optional TLP prefix 202, a TLP header 204, the data payload 206, and an optional TLP digest 208. TLP header 204 includes a type field 210. Type field 210 may indicate types of transactions. TLP header 204 may include a first attribute field 212, a second attribute field 214, and a traffic class field 216 as part of a PCIe transaction descriptor that carries transaction information, such as address information, between root complex 153 and PCIe end point devices, such as storage device 102A, 102B.

As TLPs 200 are transferred between host 150 and storage device 102, a data link layer and physical layer are added to each TLP 200 to ensure TLP 200 arrives at the intended destination. Each TLP 200 includes a certain overhead from the added data link layer and physical layer reducing the effective data transfer rate of TLP 200. For example, TLP 200 may include an optional end-to-end cyclic redundancy checksum (ECRC) in TLP digest 208. A data link layer adds the sequence number and link layer CRC (LCRC) to TLP 200 to ensure successful transmission across the link. A physical layer adds information to mark the beginning and end of TLP 200.

In response to read requests, completion TLPs 200 contain the requested data as a data payload 206. In response to write request, write request TLPs contains the data to be written as a data payload 206. Each PCIe device is set to a certain maximum TLP payload size (MPS) for a data payload 206, such as 128 bytes, 256 bytes, 512 bytes, 1 kilobytes, 2 kilobytes, 4 kilobytes, etc.

During enumeration and configuration of connected devices, such as storage device 102A, 102B within system 100, the connected devices advertise their maximum TLP payload size supported. System 100 default setting is to use the highest common maximum TLP payload size supported along a path of TLP 200. For example, if storage device 102 is connected to host 150 through a switch (not shown), the maximum TLP payload size is limited to the highest common maximum TLP payload size of host 150, storage device 102, and switch 157. In other words, when a TLP is sent between a source PCIe device and a destination PCIe device, the TLPs are sent with a data payload size equal to or less than the lowest maximum TLP payload size setting along the TLPs' path.

Also during configuration, a maximum read request size is set into each PCIe device's control register. The maximum read request size is the maximum size of a memory read request, which in PCIe protocol is from a floor of 128 bytes to a ceiling of 4096 bytes. Computer systems are set to a highest maximum read request that is allowable for increased performance.

In a default setting, a read request is issued up to the maximum read request size to provide better system performance since fewer memory read requests are issued over the PCIe bus. However, a large read request size may increase latency due to the awaiting for the return of a completion TLP 200. For example, when switch 157 is implementing store-and-forward packet switching, switch 157 will not start transferring to the destination address until the entire TLP has been received and stored internally in switch 157. Therefore, if the accessed data has a size of 4 KB, switch 157 will store the entire 4 KB of data in switch 157 prior to forwarding the data which increases latency.

Figure 3A:
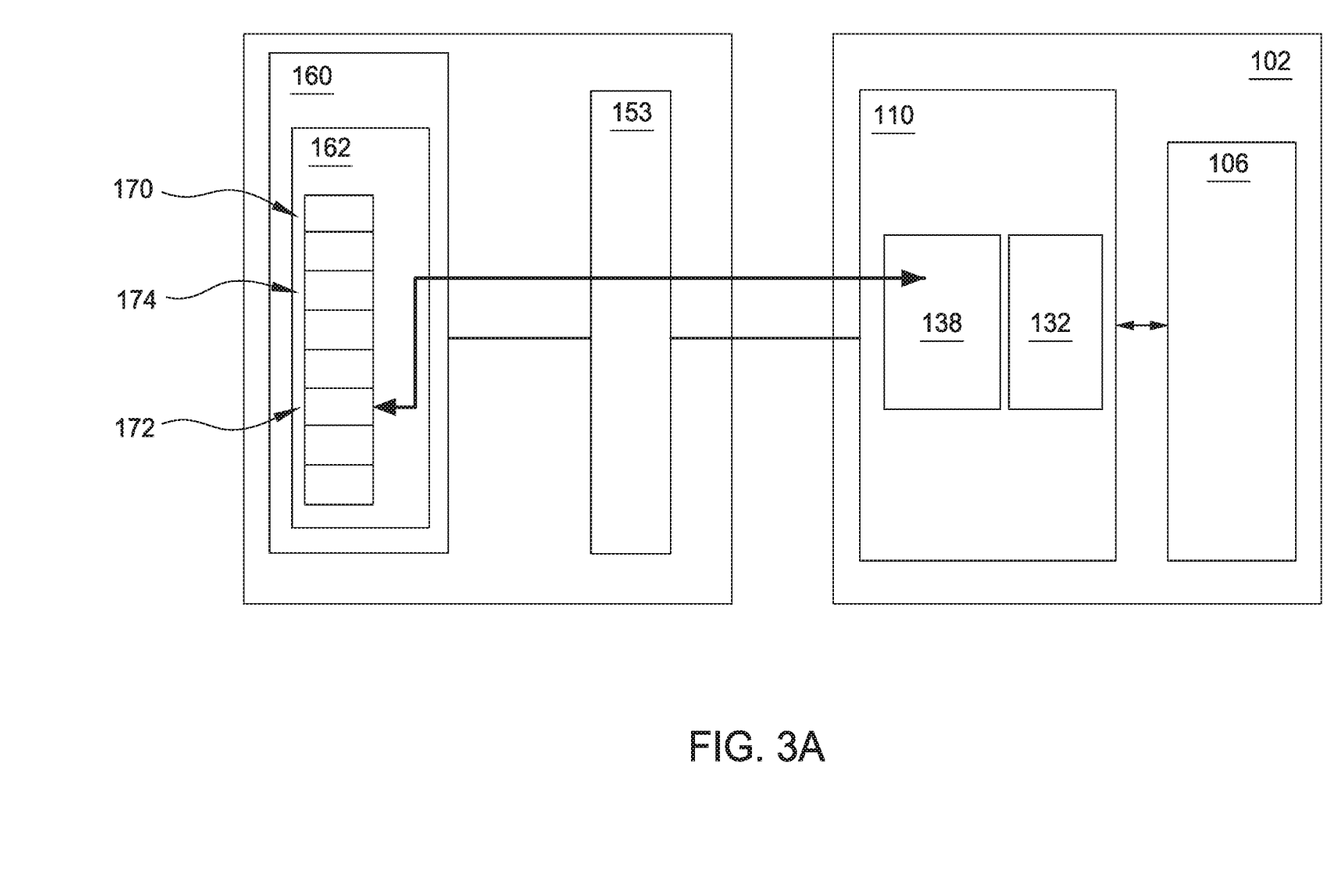
FIGS. 3A-3C are schematic illustrations of when latency from a host read request is critical in certain embodiments.
Figure 3B:
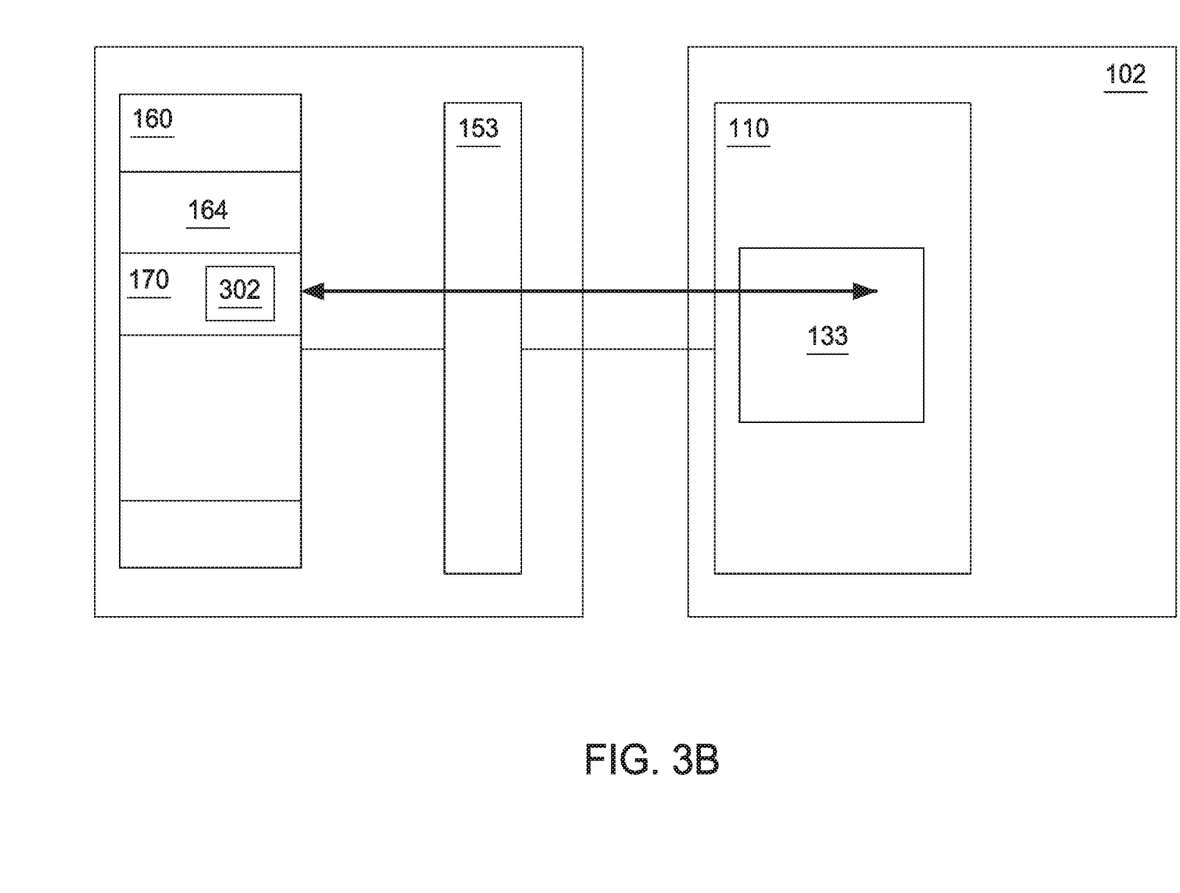

In certain instances, latency is critical or is balanced with performance. FIGS. 3A-3B are examples of when latency from a host read request is critical, although other examples are possible. FIGS. 3A-3B are described in reference to system 100 with host directly coupled to storage device 102A or coupled to storage device 102B through switch 157 of FIG. 1, although other system may be applicable. Some elements of system 100 are hidden for ease of description.

FIG. 3A is a schematic illustration of a host read command issued by storage device 102 to fetch a host command from a command submission queue 170 of host queues 162 of host memory space 160. Host commands are queues in a plurality of entries of command submission queue 170. Storage device 102 fetches host commands by command fetcher 110 issuing a host read command to an entry of command submission queue identified by a head pointer 172. Host 150 adds a new command to command submission queue 170 by adding the new command to an empty entry identified by tail pointer 174 and by incrementing the tail pointer 174 to the next empty entry. When command submission queue 170 has a low host command queue depth (i.e., a low number of commands in the queue), the latency may become more relevant since performance of system 100 may be limited by flash interface module 132 interfacing with NVM 106, such as NAND flash memory. For example, when command submission queue 170 has a low host command queue depth, storage device 102 may issue several host memory read requests in order to fetch one or more commands from command submission queue 170 rather than fetching all of the commands together using a single memory read request.

FIG. 3B is a schematic illustration of a host read command issued by storage device 102 to fetch an internal table 302 from a host memory buffer 170 of data buffer 164. For example, DMA 133 in certain scenarios must fetch internal table 302, such as address translation tables, from host memory buffer 170 when storage device 102 is using host memory buffer 170 as a data buffer. Since storage device 102 may need to fetch internal table 302 prior to accessing other data in host memory buffer 170, latency may become more relevant since performance of system 100 may be limited until internal table 302 is fetched. For example, storage device 102 may issue several host memory read requests in order to fetch portions of internal table 302 rather than fetching the entire internal table 302 together using a single memory read request.

Figure 3C:
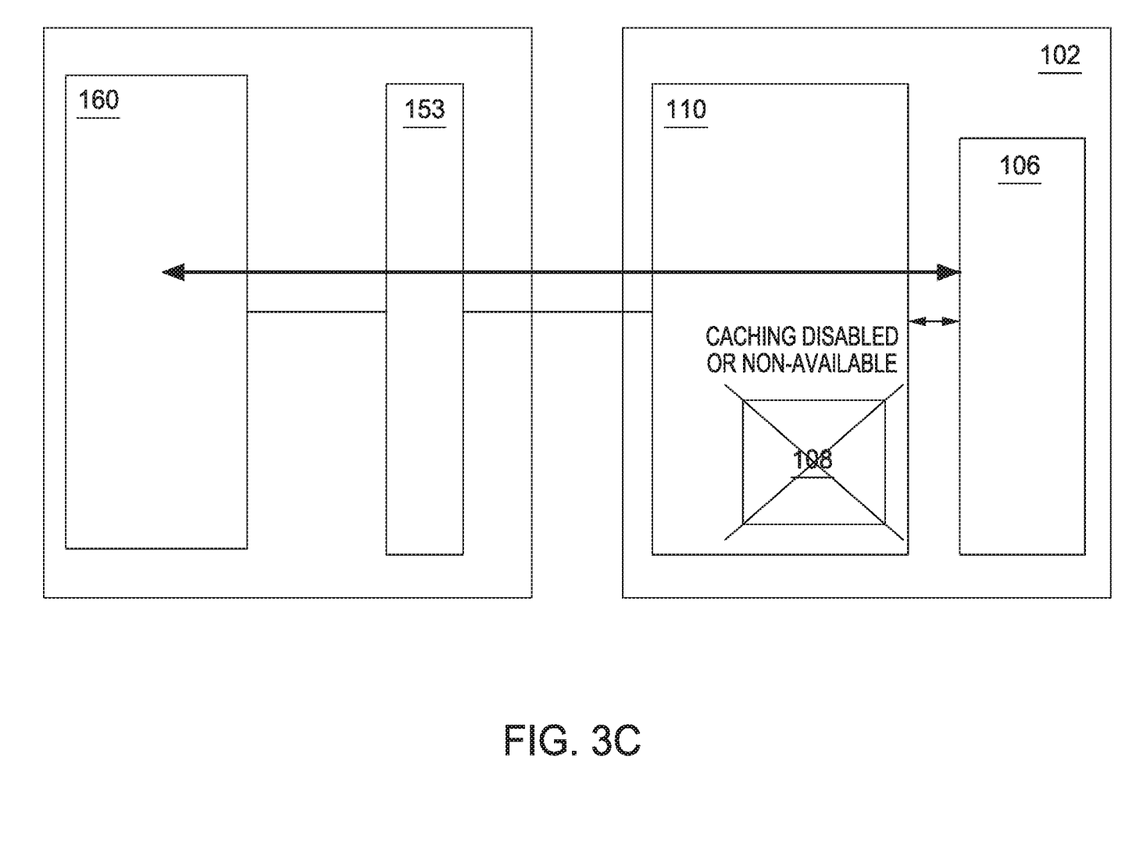

FIG. 3C is a schematic illustration of a host read command issued by storage device 102 to fetch data from host memory space 160 to be written as part of a forced unit access write operation. The forced unit access write operation to storage device 102 may involve directly writing data from host memory space 160 to NVM 106 in which caching by cache buffer 108 of storage device is disabled or not available. Latency may become more relevant since host 150 may wait for completion of the forced unit access write operation before proceeding with other operations. For example, storage device 102 may issue several host memory read requests in order to fetch portions of the data in a forced unit access write operation rather than fetching the entire data together in a single memory read request.

Figure 4:
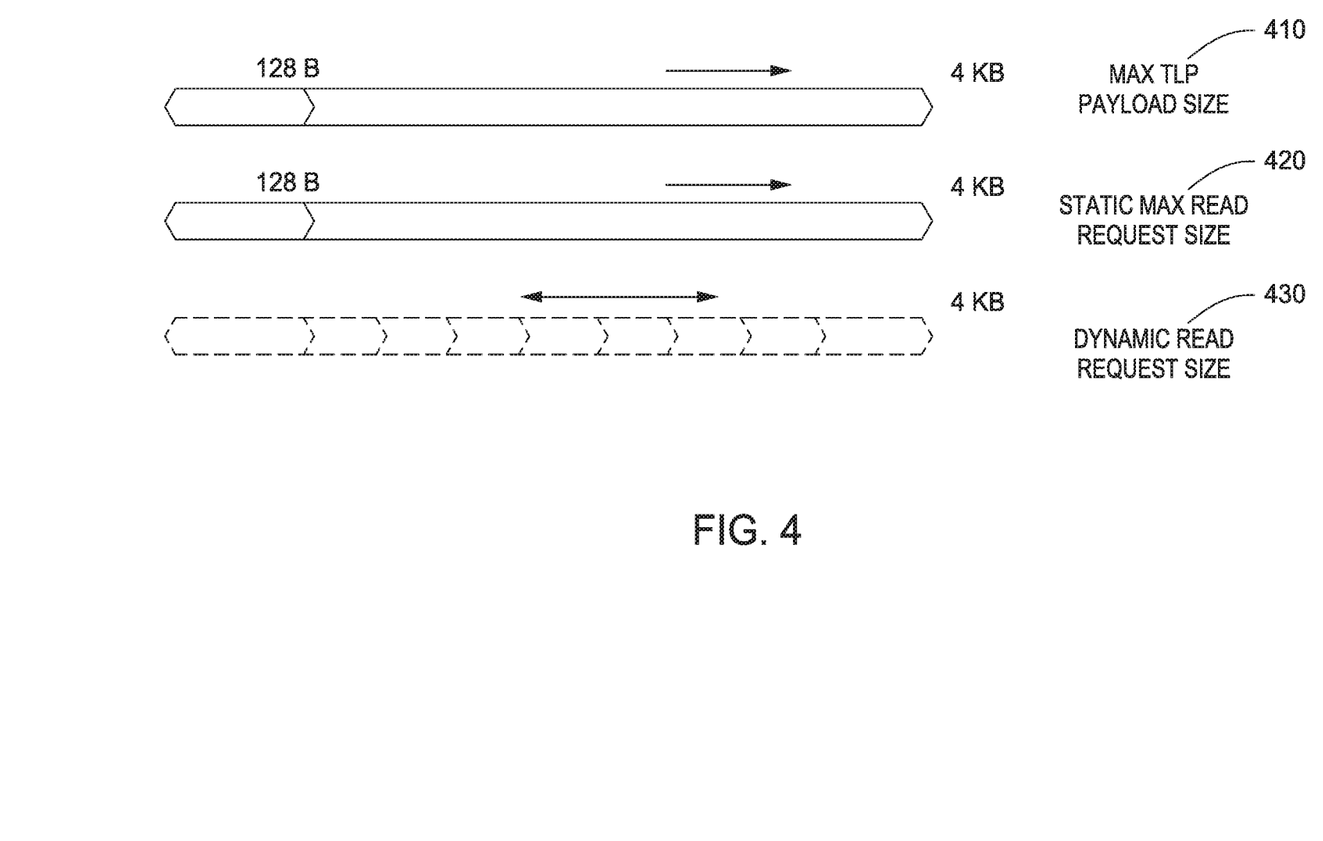
FIG. 4 is a schematic diagram of various TLP parameters under the PCIe protocol in certain embodiments.

FIG. 4 is a schematic diagram of various TLP parameters under the PCIe protocol in certain embodiments. FIG. 4 is described in reference to system 100 with host directly coupled to storage device 102A or coupled to storage device 102B through switch 157 of FIG. 1, although other system may be applicable, and in reference to TLP 200 of FIG. 2, although other data packets may be applicable. A maximum TLP payload size 410 various from 128 bytes to 4 kilobytes and TLPs must be sent with a data payload size equal to or less than the common or lowest maximum TLP payload size along the TLPs' path. During enumeration and configuration of connected devices, such as storage device 102A, 102B within system 100, the connected devices advertise their maximum TLP payload size supported. System 100 uses the highest common maximum TLP payload size supported along a path of TLP 200. For example, if storage device 102 is connected to host 150 through a switch (not shown), the maximum TLP payload size is limited to the highest common maximum TLP payload size of host 150, storage device 102, and switch 157. In other words, when a TLP is sent between a source PCIe device and a destination PCIe device, the TLPs are sent with a data payload size equal to or less than the lowest maximum TLP payload size setting along the TLPs' path.

A static maximum read request size (MRRS) 420 is the maximum read request size statically set from a floor of 128 bytes to a ceiling of 4 kilobytes. Static MRRS 420 is set into each PCIe device's control register. Static MRRS 420 is the maximum size of a memory read request, which in PCIe protocol is from a floor of 128 bytes to a ceiling of 4096 bytes. In a default setting, host 150 sets storage device 102 to a highest level for static MRRS 420 that is allowable for increased performance. Static MRRS 420 is a static parameter configured by host 150. Storage device 102 may not issue any PCIe memory read request of a TLP data payload size 206 that exceeds this parameter. System 100 default setting is for storage device 102 to issue read request of the highest level of TLP data payload size 206 allowable by maximum TLP payload size 410 and static MRRS 420.

In various embodiments, storage device 102 issues read request with a dynamic read request size 430 which varies in size based upon whether latency is critical in fetching the data. For example, the read request TLP payload size may be less that static MRRS 420 even though the data requested has a larger size allowable by static MRRS 420. Controller 101 of storage device 102 may internally limit data payload 206 of a memory read request even though host configuration of static MRRS 420 allows data payload 206 to be larger in size. For example, host 150 may set MRRS 420 to 4 kilobytes while storage device 102 issues host read request in a dynamic read request size from 128 bytes up to 4 kilobytes and any size in between in 128 bytes increments. Dynamic read request size 430 may be determined based upon a latency desired.

Figure 5:
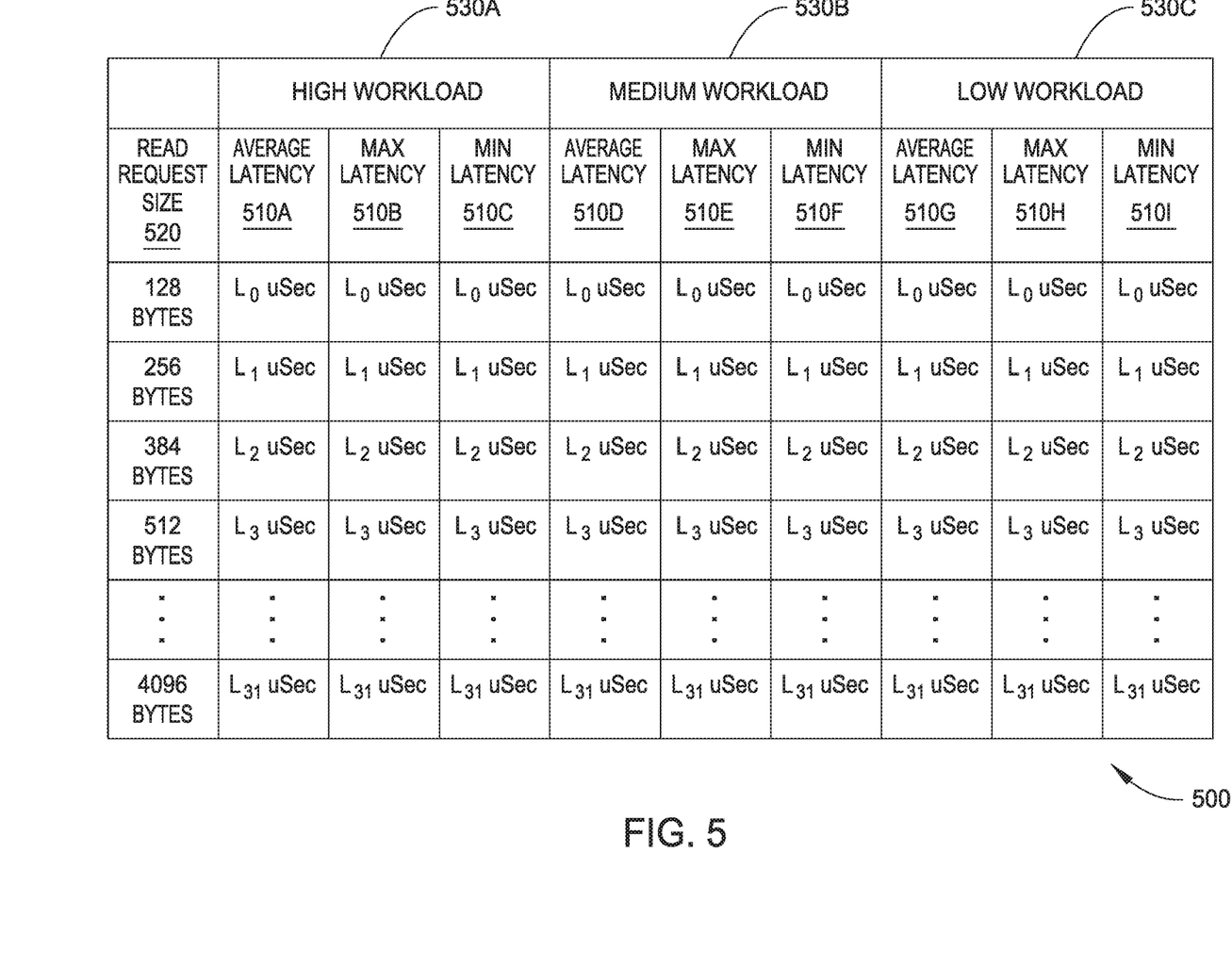
FIG. 5 shows a latency table recording the various latencies of various read request sizes in certain embodiments.

In certain embodiments, a host read request may be sent with a dynamic read request size 430 based upon a desired latency. For example, storage device 102 as shown in FIG. 1 may include a latency monitor 120. The latency monitor 120 determines the time between when storage device issues a read request TLP to host 150 and when storage device receives a completion packet TLP. FIG. 5 shows certain embodiments of a latency table 500 recording the one or more latencies 510 of various read request sizes 520 in 128 bytes increments up to 4096 bytes. For example, latency monitor 120 may determine an average latency, a maximum latency, and/or a minimum latency. In certain embodiment, latency monitor 120 may determine various latencies 510 in various conditions of the link(s) between host 150 and storage device 102A, 102B. For example, various latencies 510 may be determined under a high workload 530A, medium workload 530B, and/or low workload 530C across the host-storage device link. Latency table 500 may be stored in stored in cache buffer 108.

Figure 6:
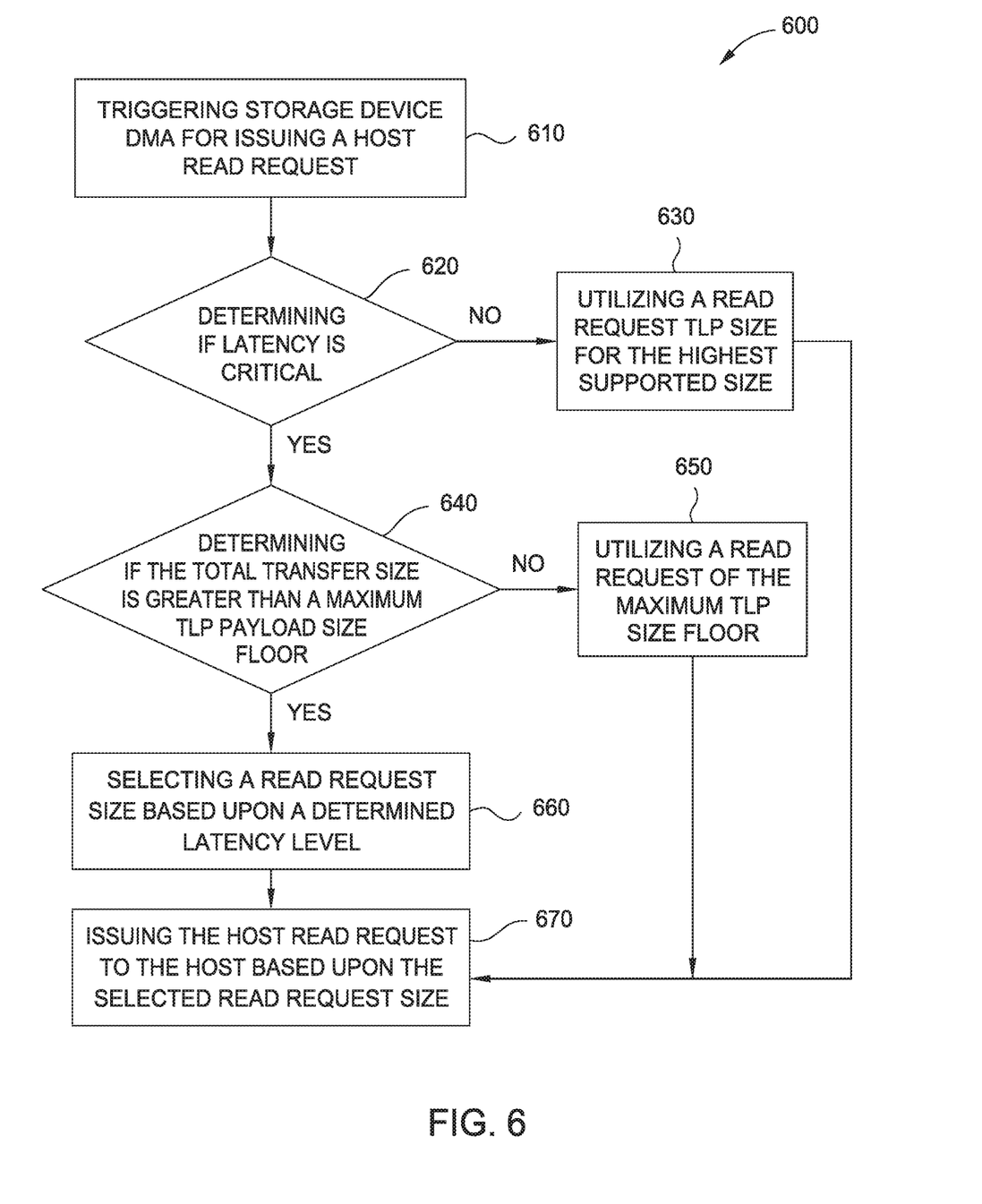
FIG. 6 is a schematic diagram illustrating one embodiment of a method of selecting a transfer size of a read requests TLP.

FIG. 6 is a schematic diagram illustrating one embodiment of a method 600 of selecting a transfer size of a read requests TLP issued to host 150 described in reference to system 100 of FIG. 1, although other system may be applicable. One or more blocks of method 600 may be performed by controller 110 executing computer-readable program code (e.g., software or firmware) executable instructions stored in storage device 102.

At block 610, DMA 133 is triggered to issue a host read request. At block 620, DMA 133 determines if latency is critical for the host read request. For example, DMA 133 may determine that the host read request is associated with a low host command submission queue depth, with a host memory buffer, with a forced unit access for a write operation, or with other operations. If latency is determined to be not critical, DMA 133 issued a host read request for the highest supported read request size allowable by maximum TLP payload size ceiling and by static MRRS 420 at block 630.

If DMA 133 determines that latency is critical, then at block 640, DMA 133 determines if the total transfer size is greater than a maximum TLP payload size floor, such as 128 bytes. If the total transfer size is not greater than a maximum TLP payload size floor, the read request is issued utilizing the maximum TLP payload size floor at block 650.

If the total transfer size is greater than a maximum TLP payload size floor, then at block 660, DMA 133 utilizes an adaptive TLP attributes selector 122 to select a read request size correlated to a desired latency. The read request size is lower than a size allowable by static MRRS 420. In some embodiments, adaptive TLP attributes selector 122 utilizes the latency table 500 generated by the latency monitor 120 to correlate which read request size to select based upon the measured latency.

At block 670, DMA 670 issue the host read request in a read request size as selected at block 660 or at block 630.

Figure 7:
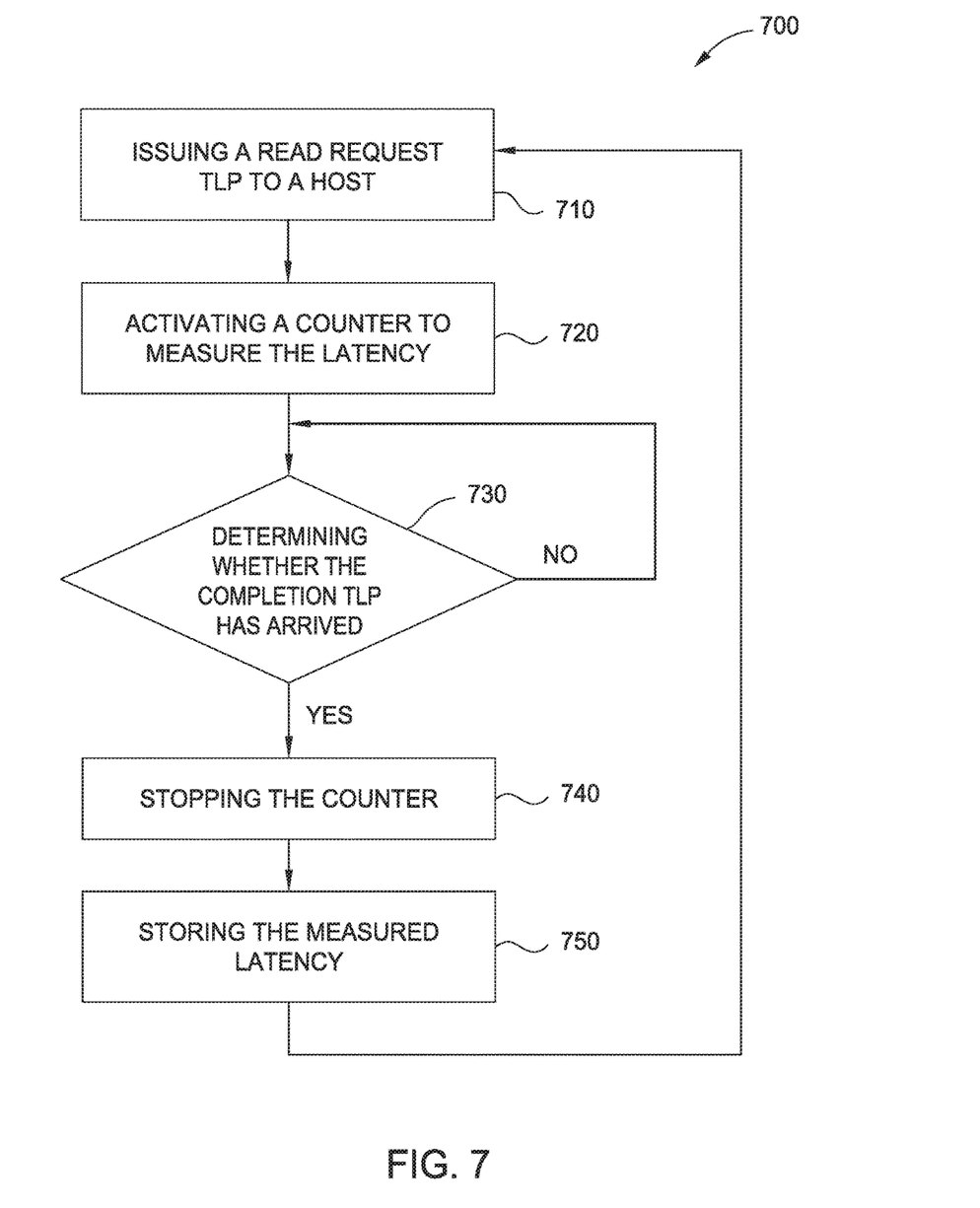
FIG. 7 is a schematic diagram illustrating one embodiment of a method of measuring a latency between various sizes of read request TLPs issued to host and associated completion TLPs.

FIG. 7 is a schematic diagram illustrating one embodiment of a method 700 of measuring a latency between various sizes of read request TLPs issued to host and associated completion TLPs described in reference to system 100 of FIG. 1, although other system may be applicable. One or more blocks of method 700 may be performed by controller 110 executing computer-readable program code (e.g., software or firmware) executable instructions stored in storage device 102.

At block 710, storage device 102 issues a TLP read request to host 150. Once or after the read request TLP is issued, the latency monitor 120 runs a counter at block 720. At block 730, whether the completion TLP from host 150 to storage device 102 has arrived is determined.

At block 740, one or after the completion TLP has arrived, the latency monitor 120 stops the counter. In the case where host 150 responds to a single memory read request with multiple completion TLPs with multiple data payloads, the latency monitor 120 stops the counter after all of the multiple completion TLPs have been received.

At block 750, the time or the latency from issuance of the read request TLP at block 710 from the arrival of the completion TLP at block 730 is store in a table, such as table 500 of FIG. 5.

Method 700 may be repeated over various read request TLP sizes and various host-storage device conditions to store a latency associated with the various read request TLP size in a table, such as table 500 of FIG. 5.

While the foregoing is directed to embodiments of the present disclosure, other and further embodiments of the disclosure may be devised without departing from the basic scope thereof, and the scope thereof is determined by the claims that follow.

What is claimed is:

1. A method of accessing data by a storage device with reduced latency, comprising:
   triggering a controller of the storage device for issuing a host read request;
   determining if latency is critical for completion of the host read request; and
   issuing the host read request in a dynamic host read request size if latency is critical, wherein the dynamic host read request size is lower than a static maximum read request size, wherein the host read request is part of a forced unit access write operation.

2. The method of claim 1, wherein the host read request is fetching from a host command submission queue.

3. The method of claim 2, wherein the host command submission queue has a low command queue depth.

4. The method of claim 1, wherein the host read request is fetching from a host memory buffer.

5. The method of claim 4, wherein the host read request is fetching an internal table from the host memory buffer.

6. A storage device with reduced latency, comprising:
   a non-volatile memory;
   a controller coupled to the non-volatile memory, the controller comprising:
      physical layers (phys) adapted to be linked to a host;
      a direct memory access module configured to execute data transfers between the host and the storage device without involvement from a CPU, the direct memory access module comprising:
         an adaptive transaction layer packets (TLP) attributes selector, wherein the adaptive TLP attributes selector utilizes a latency table generated by a latency monitor to correlate a read request size to select based upon a measured latency; and
      the latency monitor, the latency monitor configured to measure a plurality of latencies between a plurality of read request TLPs issued by the direct memory access module and a plurality of completion transaction layer packets received by the controller.

7. The storage device of claim 6, wherein the phy is adapted to linked to the host using a PCI express protocol.

8. The storage device of claim 6, wherein the controller further comprises a latency table storing measured latencies between the plurality of read request transaction layer packets and the plurality of completion transaction layer packets.

9. The storage device of claim 6, wherein the controller further comprises a cache operable to store a latency table.

10. The storage device of claim 6, wherein the controller further comprises a direct memory access module configured to issue a host read request in a transaction size based on the measured plurality of latencies.

11. The storage device of claim 10, wherein the direct module access module determines whether the host read request is latency critical.

12. The storage device of claim 10, wherein the direct memory access module selects the transaction size based upon a desired latency correlated to one of the measured plurality of latencies.

13. The storage device of claim 12, wherein the selected transaction size does not exceed a maximum TLP payload size ceiling supported by the storage device, the host, and any devices coupling the storage device and the host.

14. A method of accessing data by a storage device with reduced latency, comprising:
   determining whether a host read request to be issued is latency critical;
   determining whether a transaction size to be requested by a host read request is greater than a maximum transaction layer packets (TLP) payload size;
   selecting a read request size in response to determining the transaction size is greater than the maximum transaction layer packet payload size; and
   issuing a host read request in the selected read request size, wherein the host read request is part of a forced unit access write operation.

15. The method of claim 14, wherein the selected read request size is selected based upon a desired latency.

16. The method of claim 14, wherein the selected read request size is selected by matching a measured latency of prior host request requests.

17. The method of claim 14, wherein the selected read request size does not exceed a supported maximum TLP payload size ceiling of the storage device, of the host, and any other devices connecting the storage device and the host.

18. The method of claim 14, wherein the selected read request size is less than a static maximum read request size.

19. The method of claim 14, wherein the storage device and the host are linked through a PCI Express protocol.

20. A storage device with reduced latency, comprising:
   a non-volatile memory;
   a transaction layer packet (TLP) payload size selector means, the TLP payload size selector means configured to select a transaction size of a read request TLP based upon a desired latency; and
   a direct memory access module configured to execute data transfers between a host and the storage device without involvement from a CPU, the direct memory access module comprising:
      an adaptive TLP attributes selector, wherein the adaptive TLP attributes selector utilizes a latency table generated by a latency monitor to correlate a read request size to select based upon a measured latency.

21. The storage device of claim 20, wherein the storage device is linked to a host over a PCI Express protocol.

22. The storage device of claim 20, wherein the TLP payload size selector means is configured to access a latency table to select the transaction size.

23. The storage device of claim 20, wherein the TLP payload size selector means selects the transaction size of the read request TLP based upon an attribute of the read request TLP.

24. The storage device of claim 23, wherein the attribute of the read request TLP is whether the read request is latency critical.

25. A storage device with reduced latency, comprising:
a non-volatile memory; and
a controller coupled to the non-volatile memory and coupled to a host through one or more PCIe links, wherein the controller is operable to:
determine if latency is critical for completion of a host read request; and
issue the host read request in a selected read request size based upon a selected latency, wherein the host read request is part of a forced unit access write operation.

26. The storage device of claim 25, wherein the host read request comprises one or more read request transaction layer packets (TLPs) with a path from the storage device to a switch to the host.

27. The storage device of claim 26, wherein the switch is in a store-and-forward mode.

28. The storage device of claim 25, wherein the host read request is fetching a host command from an NVMe command submission queue of a host memory space.

29. The storage device of claim 25, wherein the host read request is fetching an address translation table from a host memory buffer.

* * * * *